(12) United States Patent
Tominaga

(10) Patent No.: US 8,894,210 B2
(45) Date of Patent: Nov. 25, 2014

(54) OPTICAL ELEMENT, LIGHT SOURCE DEVICE, AND PROJECTION-TYPE DISPLAY DEVICE

(75) Inventor: Shin Tominaga, Minato-ku (JP)

(73) Assignee: NEC Corporation, Tokyo (JP)

( * ) Notice: Subject to any disclaimer, the term of this patent is extended or adjusted under 35 U.S.C. 154(b) by 380 days.

(21) Appl. No.: 13/500,249

(22) PCT Filed: Sep. 27, 2010

(86) PCT No.: PCT/JP2010/066651
§ 371 (c)(1),
(2), (4) Date: Apr. 4, 2012

(87) PCT Pub. No.: WO2011/043208
PCT Pub. Date: Apr. 14, 2011

(65) Prior Publication Data
US 2012/0200831 A1    Aug. 9, 2012

(30) Foreign Application Priority Data

Oct. 5, 2009 (JP) ................................. 2009-231454

(51) Int. Cl.
*G03B 21/14* (2006.01)
(Continued)

(52) U.S. Cl.
CPC ................ *G02B 6/0056* (2013.01); *G02B 5/30* (2013.01); *G03B 21/14* (2013.01); *G02F 1/133504* (2013.01); *G02F 1/133536* (2013.01); *G02B 6/0068* (2013.01); *G02F 2001/133638* (2013.01); *G02F 2201/307* (2013.01); *G02F 2202/32* (2013.01)
USPC ............ 353/20; 359/485.01; 359/15; 359/34; 349/62; 349/96; 385/11; 385/133; 362/19; 362/610; 362/615

(58) Field of Classification Search
USPC ........ 353/20; 359/485.01, 15, 34; 349/62, 96; 385/11, 133; 362/19, 610, 615
See application file for complete search history.

(56) References Cited

U.S. PATENT DOCUMENTS 6,335,999 B1 * 1/2002 Winston et al. ................ 385/146
2005/0088740 A1    4/2005 Takeda et al.

FOREIGN PATENT DOCUMENTS

CN    1680854 A     10/2005
JP    11-281978 A   10/1999
(Continued)

OTHER PUBLICATIONS

Office Action dated Dec. 3, 2013, issued by the State Intellectual Property Office of the P.R.C. in corresponding Chinese Application No. 201080044789.0.

*Primary Examiner* — Georgia Y Epps
*Assistant Examiner* — Magda Cruz
(74) *Attorney, Agent, or Firm* — Sughrue Mion, PLLC

(57) ABSTRACT

An optical element is provided with: first polarization-separation layer (13) that is laminated on first surface (12b) of light guide body (12) and that, of the light incident from light guide body (12), transmits X-polarized light and reflects Y-polarized light that is orthogonal to the X-polarized light; polarization hologram layer (14) that is laminated on first polarization-separation layer (13) and that diffracts to a prescribed diffraction angle the X-polarized light that is incident within a prescribed range of angles of incidence and converts the X-polarized light to Y-polarized light; second polarization-separation layer (15) that is laminated on polarization hologram layer (14) and that, of the light incident from polarization hologram layer (14) transmits Y-polarized light and reflects X-polarized light; reflection layer (18) provided on second surface (12c) side of light guide body (12); and phase difference layer (17) that is provided between first surface (12b) of light guide body (12) and reflection layer (18) and that imparts a phase difference before and after transmission to mutually orthogonal polarization components of the incident light.

16 Claims, 16 Drawing Sheets

(51) Int. Cl.
*G02B 5/30* (2006.01)
*G02B 27/28* (2006.01)
*G02F 1/1335* (2006.01)
*G02B 6/00* (2006.01)
*F21V 9/14* (2006.01)
*F21V 8/00* (2006.01)
*G02F 1/13363* (2006.01)

(56) References Cited

FOREIGN PATENT DOCUMENTS

| | | |
|---|---|---|
| JP | 2003-207646 A | 7/2003 |
| JP | 2004-287347 A | 10/2004 |
| JP | 2005-128216 A | 5/2005 |
| JP | 2005-300697 A | 10/2005 |

* cited by examiner

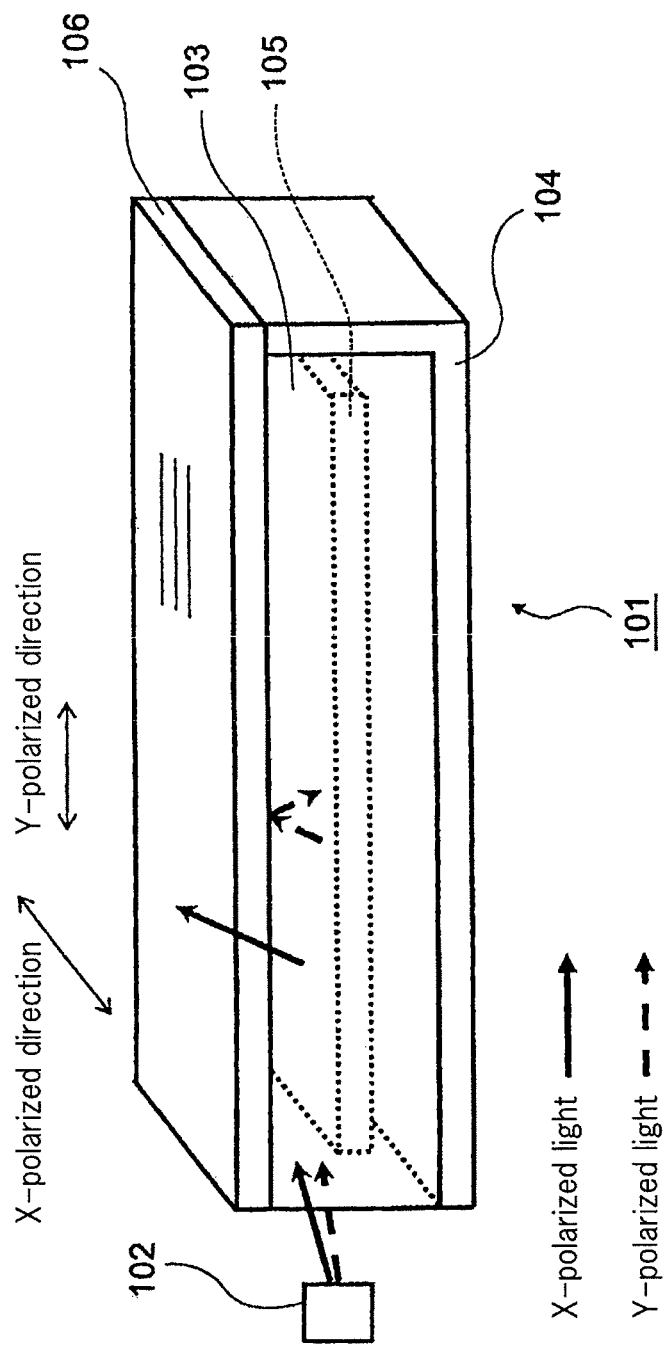

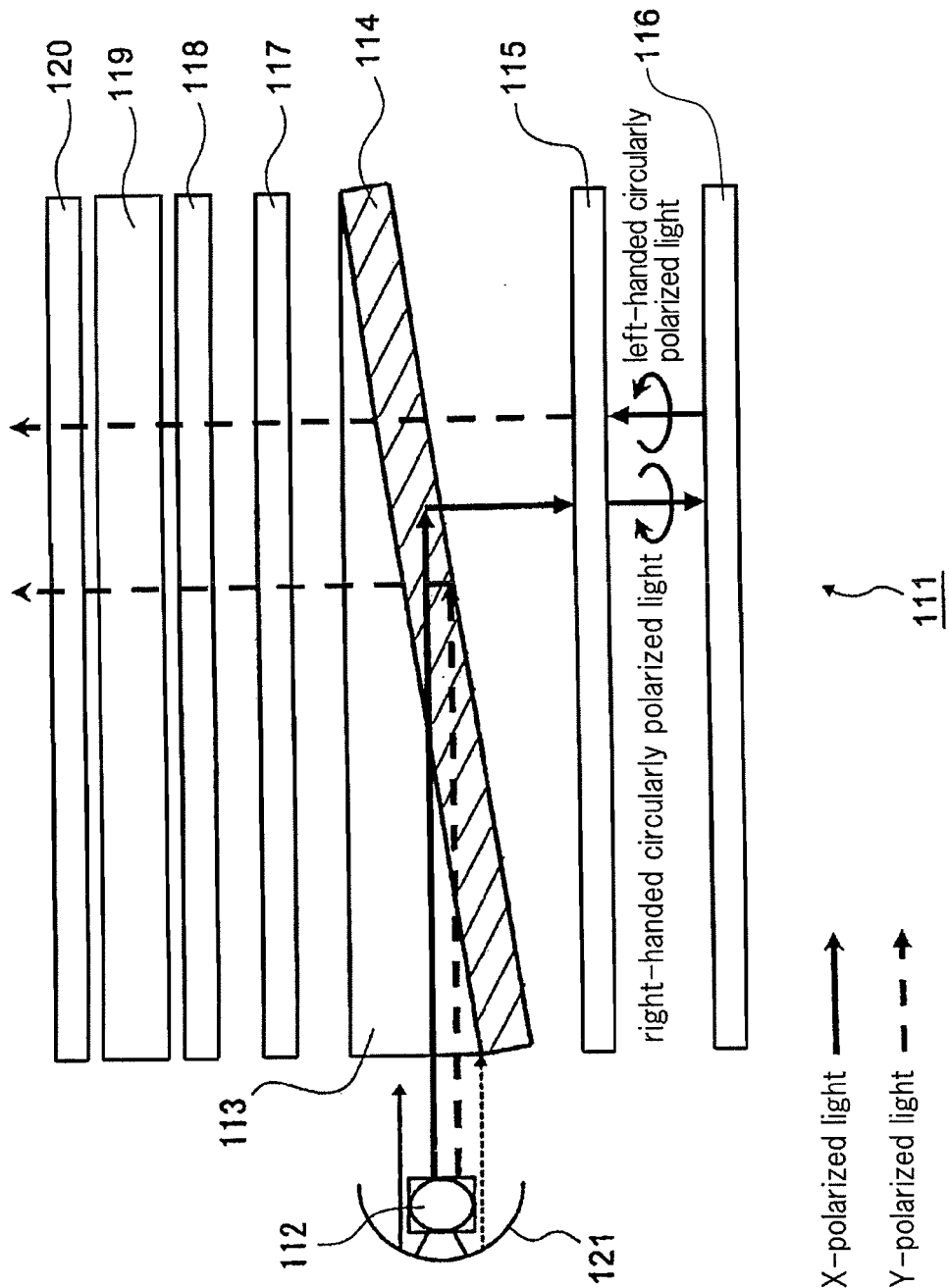

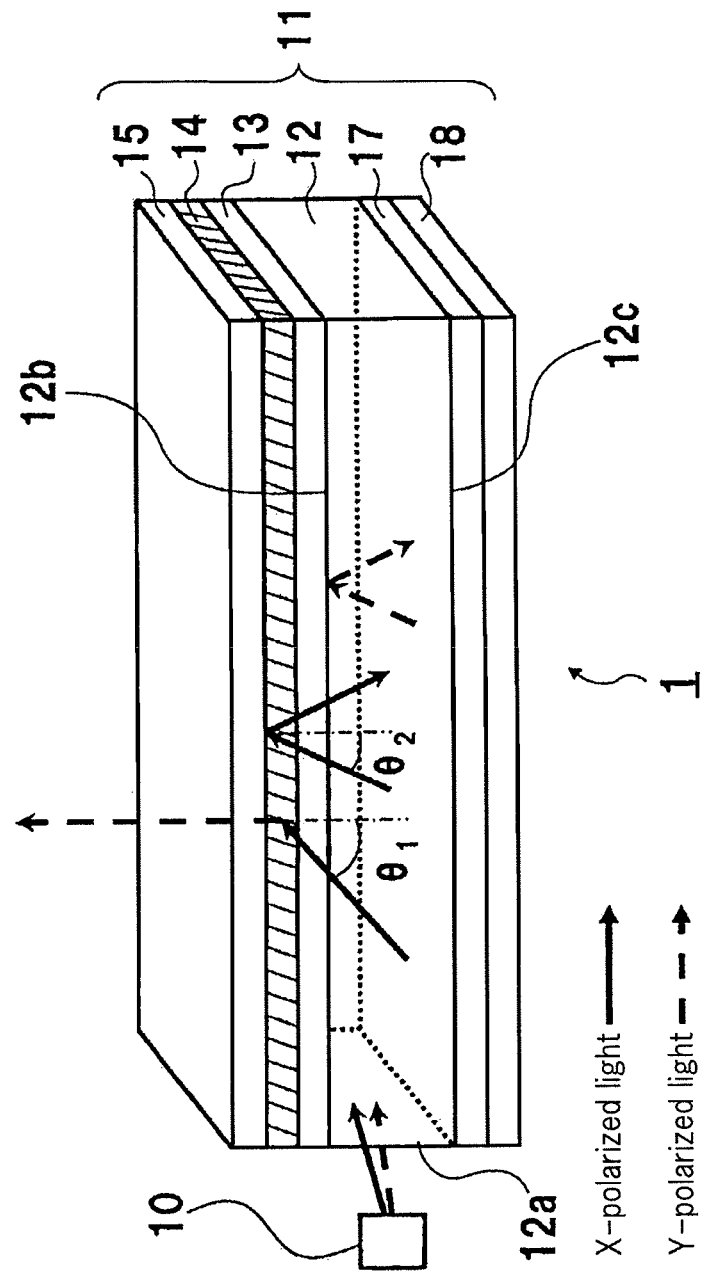

X-polarized light ⟶
Y-polarized light -- ▶

X-polarized light ⟶
Y-polarized light -- ▶

X-polarized light ⟶
Y-polarized light ─ ─ ➤

X-polarized light ⟶
Y-polarized light ― ― ➔

X-polarized light ⟶
Y-polarized light ― ― ➔

X-polarized light ⟶
Y-polarized light --→

OPTICAL ELEMENT, LIGHT SOURCE DEVICE, AND PROJECTION-TYPE DISPLAY DEVICE

CROSS REFERENCE TO RELATED APPLICATIONS

This application is a National Stage of International Application No. PCT/JP2010/066651 filed Sep. 27, 2010, claiming priority based on Japanese Patent Application No. 2009-231454, filed Oct. 5, 2009, the contents of all of which are incorporated herein by reference in their entirety.

TECHNICAL FIELD

The present invention relates to an optical element that uses a light guide and hologram to emit light, a light source device, and a projection-type display device.

BACKGROUND ART

A LED projector has been proposed that has a light source device that employs a light-emitting diode (LED) as a light source. Compared to a discharge lamp, an LED, which is a solid-state light source, has the advantages of being mercury-free, capable of quick-start/quick-off lighting operation, and highly durable. An LED projector of this type of the prior art is made up of a light source device, illumination optics into which light from the light source device is irradiated, a light valve having a liquid crystal display panel into which light from the illumination optics is irradiated, and projection optics for projecting light from the light valve onto a projection surface.

In order to increase the luminance of a projected image in this type of LED projector, it is desirable that all possible measures be taken to limit optical loss in the optical path from the light source device to the projection surface.

The two chief causes of optical loss that can be considered are as described below.

The first cause is polarization loss that arises from polarization dependence of a liquid crystal display panel or dichroic prism.

The second cause is the occurrence of light that diverges and does not enter each optical element arranged on the optical path, i.e., optical loss resulting from eclipse in each optical element. This occurs because light from a light source device cannot be used as projection light unless the product of the angle of radiation (solid angle) of emitted light from optical elements belonging to the light source device and the light emission area (etendue) is made lower than the value of the product of the area of the display element and the acceptance angle (solid angle) that is determined by the f-number of the projection lens.

As one countermeasure for solving the above-described problems relating to optical loss, the use of an optical element made up of a hologram and a light guide body has been proposed with the object of generating light that is irradiated into a liquid crystal display element.

As one example of an optical element that uses a hologram and a light guide body, Patent Document 1 discloses optical element 101 that is provided with: light guide body 103 into which light from light source LED 102 is irradiated; hologram 104 that diffracts light from this light guide body 103; polarization-conversion layer 105 that imparts a predetermined phase difference to mutually orthogonal polarization components of light that is transmitted through; and polarization-separation layer 106 that emits only linearly polarized light having a polarization component of a specific direction from this polarization-conversion layer 105, as shown in FIG. 1.

As another example of an optical element that uses a hologram and a light guide body, Patent Document 2 discloses optical element 111 that is provided with: light guide body 113 into which light from cold-cathode tube 112 as the light source is irradiated; hologram 114 that diffracts only linearly polarized light having a polarization component of a specific direction from this light guide body 113; quarter-wave plate 115 into which light that was diffracted by this hologram 114 is irradiated; and reflection plate 116 that reflects light that has been transmitted through this quarter-wave plate 115, as shown in FIG. 2. In addition, in this optical element 111, diffuser plate 117 into which polarized light that has been diffracted by hologram 114 is irradiated, polarization plate 118, liquid crystal cell 119, and polarization plate 120 are each arranged along the optical path. In this optical element 111, reflection plate 121 that reflects light from cold-cathode tube 112 is provided, and light from cold-cathode tube 112 is converted to parallel light by reflection plate 121 and irradiated into light guide body 113.

LITERATURE OF THE PRIOR ART

Patent Documents

Patent Document 1: Japanese Unexamined Patent Application Publication No. 2003-207646 (FIG. 1)
Patent Document 2: Japanese Unexamined Patent Application Publication No. H11-281978 (FIG. 2)

SUMMARY OF THE INVENTION

Problem to be Solved by the Invention

Nevertheless, in the configuration described in Patent Document 1 described hereinabove, the problem arises that, of linearly polarized light having a polarization component of a specific direction, light within a critical angle is emitted, whereby the solid angle of emitted light from optical element 101 becomes great. The problem therefore arises in this configuration that emitted light from optical element 101 that is converted to linearly polarized light having a polarization component of a particular specific direction has low directivity.

In the configuration described in Patent Document 2, light from cold-cathode tube 112 that has been made parallel is irradiated into light guide body 113, whereby hologram 114 is set to diffract only light that is irradiated at a particular specific angle of incidence. Accordingly, when an LED is used as a light source in this configuration, of the light from the LED, only light having a polarization component of a specific direction, and moreover, that is irradiated parallel as the above-described parallel light can be diffracted by hologram 114. As a result, of the light from the LED, a large volume of light that is transmitted without being diffracted by hologram 114 is prone to leakage to the outside from light guide body 113. In other words, a problem arises that, when an LED is used as a light source in the configuration described in Patent Document 2, the rate of utilization of light in hologram 114 is low.

is an object of the present invention to provide an optical element that is capable of the high-efficiency emission of linearly polarized light having a polarization component of a specific direction, and moreover, that has high directivity and that can thus solve the problem of the above-described related art, and to provide a light source device and projection-type display device that are provided with this optical element.

Means for Solving the Problem

To achieve the above-described object, the optical element according to the present invention is provided with:
a light guide body into which light is irradiated from a light source, the light guide body having a first surface and a second surface that is opposite this first surface;
a first polarization-separation layer that is laminated on the first surface of the light guide body, the first polarization-separation layer transmitting, of the light irradiated from the light guide body, first linearly polarized light in which the polarization component is of a specific direction and that reflects second linearly polarized light in which the polarization component is of a direction orthogonal to the first linearly polarized light;
a polarization-hologram layer that is laminated on the first polarization-separation layer and that both diffracts the first linearly polarized light that is irradiated within a predetermined range of angles of incidence to a predetermined angle of diffraction and converts the first linearly polarized light to second linearly polarized light;
a second polarization-separation layer that is laminated on the polarization-hologram layer and that transmits, of light irradiated from the polarization-hologram layer, the second linearly polarized light, and moreover, that reflects the first linearly polarized light;
a reflection layer that is provided on the second surface side of the light guide body; and a phase-difference layer that is provided between the first surface of the light guide body and the reflection layer and that imparts a phase difference to mutually orthogonal polarization components belonging to incident light before and after transmission of the incident light.

The light source device according to the present invention is provided with the optical element of the present invention and a light source that is arranged on the outer periphery of the light guide body.

The projection-type display device according to the present invention is provided with: the light source device of the present invention, a display element that imparts image information to emitted light of the light source device, and projection optics that project a projected image by means of the emitted light of the display element.

Effect of the Invention

According to the present invention as described hereinabove, light that is irradiated to an optical element from a light source can be converted to linearly polarized light of a specific direction, and moreover, emitted light of high directivity can be generated with high efficiency.

BRIEF DESCRIPTION OF THE DRAWINGS

FIG. 1 is a perspective view for describing the configuration of Patent Document 1.
FIG. 2 is a perspective view for describing the configuration of Patent Document 2.
FIG. 3 is a perspective view that gives a schematic representation of the light source device of the first exemplary embodiment.

BEST MODE FOR CARRYING OUT THE INVENTION

Figure 4A:
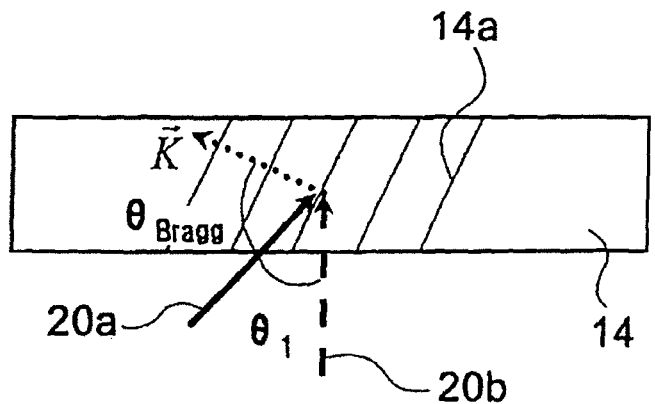
FIG. 4A is a schematic view for describing the hologram forming process of the polarization-hologram layer in the first exemplary embodiment.

Actual exemplary embodiments of the present invention are next described with reference to the accompanying drawings.

First Exemplary Embodiment

FIG. 3 shows a perspective view of the light source device of the first exemplary embodiment. Because the actual thickness of each of the layers is extremely thin and the difference in thickness of each of the layers is great in the light source device, it is difficult to depict each layer in its accurate scale and proportions. As a result, each layer is shown schematically without drawing each layer according to its actual proportions.

As shown in FIG. 3, light source device 1 of the first exemplary embodiment is provided with: light-emitting element 10 as a light source, and optical element 11 into which light emitted from this light-emitting element 10 is irradiated.

Optical element 11 is provided with light guide body 12 into which light emitted from light-emitting element 10 is irradiated. Light guide body 12 is formed as a plate form, and light-incidence surface 12a is formed on a side surface as a light-incidence portion into which light from light-emitting element 10 is irradiated. In addition, light guide body 12 includes first surface 12b on the side from which emitted light from optical element 11 is emitted and includes second surface 12c on the side opposite this first surface 12b.

The medium surrounding light source device 1 may be any of solid, liquid, and gas, and the medium on the side of incidence of light from light-emitting element 10 and the medium on the side of emission of light from optical element 11 in optical element 11 may each be different mediums.

In the present exemplary embodiment, light-emitting element 10 is arranged at a position confronting the side surface of plate-shaped light guide body 12. As light-emitting element 10, a solid-state light source such as a light-emitting diode (LED), laser diode, a super-luminescent diode, or an extra-high-pressure mercury lamp may be used. Light-emitting element 10 may be arranged separated from light-incidence surface 12a of light guide body 12, and a configuration may be adopted in which light-emitting element 10 is optically connected to light guide body 12 by a light guide member such as a light pipe.

For the sake of convenience of explanation, the direction parallel to the polarization axis along which the light of polarization-separation layer 13 is transmitted is the X direction, the direction orthogonal to the polarization axis along which the light of polarization-separation layer 13 is transmitted is the Y direction, and the X-polarization component of light from light-emitting element 10 and linearly polarized light in which the polarization direction that has undergone polarization conversion is the X direction are both referred to as "X polarized light" and are indicated by solid arrows in the figure. Similarly, the Y-polarization component of light from light-emitting element 10 and the linearly polarized light in which the polarization component that has undergone polarization conversion is the Y direction are together referred to as "Y polarized light" and are indicated by broken-line arrows in the figure.

As shown in FIG. 3, optical element 11 is provided with: first polarization-separation layer 13 that is laminated on first surface 12b of light guide body 12, that transmits X-polarized light that is irradiated from light guide body 12, and moreover, that reflects Y-polarized light; polarization-hologram layer 14 that is laminated on this first polarization-separation layer 13 and that both diffracts in a predetermined diffraction angle only X-polarized light that is irradiated within a predetermined range of angles of incidence and converts this X-polarized light to Y-polarized light; and second polarization-separation layer 15 that is laminated on this polarization-hologram layer 14 and that, of light that is irradiated from polarization-hologram layer 14, transmits Y-polarized light and reflects X-polarized light.

In addition, optical element 11 is further provided with: reflection layer 18 that is provided on the second-surface 12c side of light guide body 12, and phase-difference layer 17 that is provided between reflection layer 18 and second surface 12c of light guide body 12 and that imparts a 90-degree phase difference to mutually orthogonal polarization components of incident light before and after transmission of the light.

Although light guide body 12 is formed in plate form in the present exemplary embodiment, the shape of light guide body 12 is not limited to a rectangular parallelepiped.

Photonic crystal or polarizers are used for first polarization-separation layer 13 and second polarization-separation layer 15. When photonic crystal is used for first polarization-separation layer 13 and second polarization-separation layer 15, a periodic construction having a polarization-separation action is formed on the interface on the side of light emission from optical element 11.

First polarization-separation layer 13 transmits only one polarization component of light from the light guide body, and for example, transmits X-polarized light and reflects Y-polarized light. Second polarization-separation layer 15 is arranged such that the polarization axis of light that is transmitted is orthogonal to the polarization axis along which light of first polarization-separation layer 13 is transmitted, and in contrast to first polarization-separation layer 13, transmits only another polarization component of light from polarization-hologram layer 14, and for example, transmits only Y-polarized light and reflects X-polarized light.

Polarization-hologram layer 14 has hologram 14a that forms an interference fringe, and this hologram 14a has the functions of diffracting only incident light that satisfies the Bragg diffraction conditions and of performing polarization conversion.

Figure 4B:
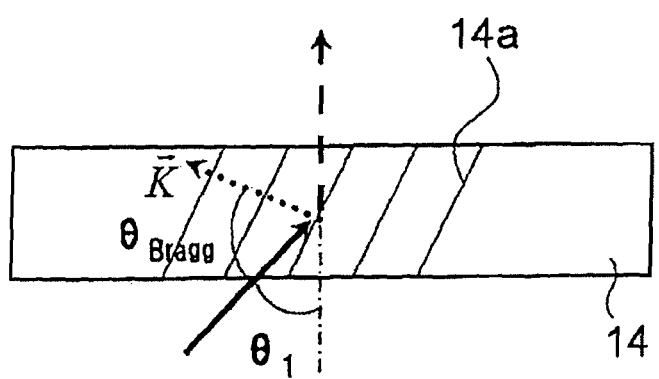
FIG. 4B is a schematic view for describing the diffraction action when the angle of incidence of light irradiated into the polarization-hologram layer satisfies the Bragg diffraction conditions in the first exemplary embodiment.
Figure 4C:
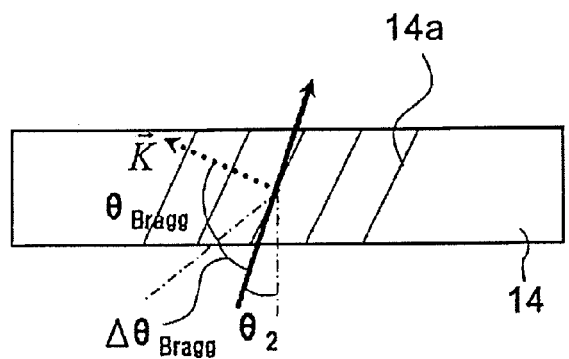
FIG. 4C is a schematic view for describing a case in which the angle of incidence of light that is irradiated into the polarization-hologram layer does not satisfy the Bragg diffraction conditions in the first exemplary embodiment.

FIGS. 4A-4C are schematic views for describing the hologram forming process and diffraction action of polarization-hologram layer 14. FIG. 4A is a schematic view for describing the hologram formation process. FIG. 4B is a schematic view for describing the diffraction action when the angle of incidence of light incident to polarization-hologram layer 14 satisfies the Bragg diffraction conditions. FIG. 4C is a schematic view for describing a case in which the angle of incidence of light incident to polarization-hologram layer 14 does not satisfy the Bragg diffraction conditions. The angle of incidence of light to polarization-hologram layer 14 and the angle of emission of light from polarization-hologram layer 14 assume that the direction orthogonal to the interface of polarization-hologram layer 14 with first polarization-separation layer 13 is 0 degrees.

As shown in FIG. 4A, reference light 20a and signal light 20b are each irradiated so as to form a predetermined interference angle $\theta 1$ in a hologram material, the hologram material that is used being a hologram material such as an azobenzene-photopolymer that is formed to a thickness in the order of 1 mm. Azobenzene has a double-refraction property having indices of refraction that differ for each of the polarization component of a direction orthogonal to the optical axis of molecules and the polarization component of the direction parallel to the optical axis of molecules, and further, the direction of the major axis of molecules is oriented in a direction orthogonal to the polarization direction of illumination light, whereby the polarization distribution of the illumination light can be recorded as the orientation distribution of the molecules. Here, desired hologram 14a is runned by irradiating X-polarized light as reference light 20a into the hologram material at a predetermined angle of incidence (interference angle) θ1 and Y-polarized light as signal light 20b at an angle of incidence of 0 degrees.

By thus forming hologram 14a, X-polarized light that is irradiated into the interface of polarization-hologram layer 14 at an angle of incidence θ1 is both diffracted at Bragg angle θBragg with wave vector K as a reference and converted to Y-polarized light when the angle of incidence θ1 of light that is incident to polarization-hologram layer 14 satisfies the Bragg diffraction conditions, as shown in FIG. 4B. The Y-polarized light is then emitted from polarization-hologram layer 14 at an angle of emission of 0 degrees.

As shown in FIG. 4C, when the angle of incidence of light that is incident to polarization-hologram layer 14 does not satisfy the Bragg diffraction conditions, X-polarized light that is irradiated at an angle of incidence θ2 (an angle of incidence that is smaller than angle of incidence θ1 by angle ΔθBragg) to the interface of polarization-hologram layer 14 is transmitted through polarization-hologram layer 14 without being diffracted by hologram 14a and without being converted to Y-polarized light. Accordingly, light that is irradiated into polarization-hologram layer 14 at an angle of incidence θ2 is emitted from polarization-hologram layer 14 at an angle of emission θ2.

Alternatively, when the light is not light for which the angle of incidence θ1 is a specific angle but light having a specific angle range, a plurality of holograms 14a corresponding to each predetermined angle of incidence is formed in polarization-hologram layer 14.

Figure 5:
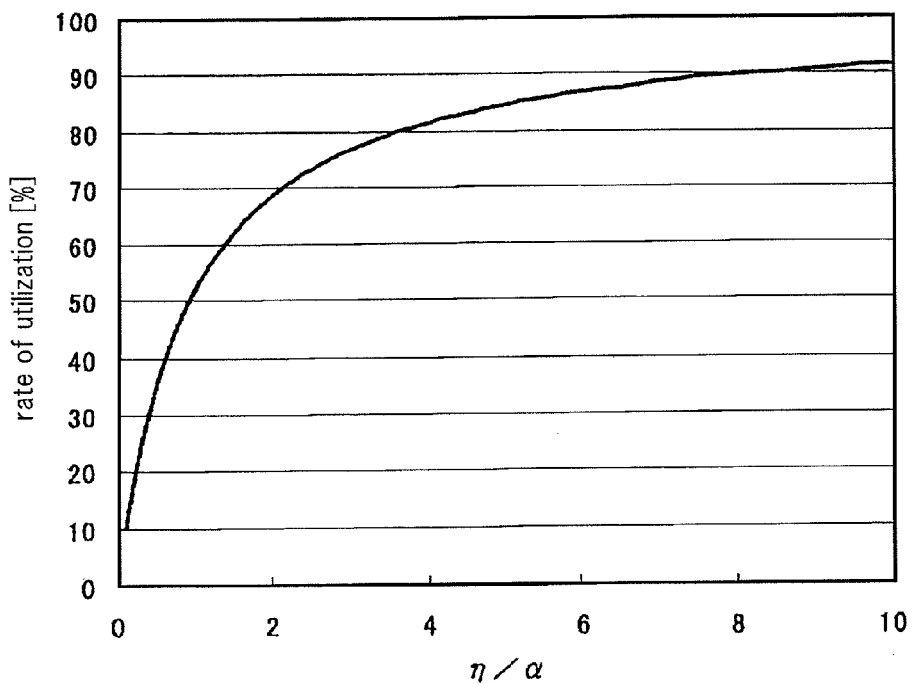
FIG. 5 shows the relation between the value of "diffraction efficiency/optical loss" and the rate of utilization of light in a polarization-hologram layer.

Regarding light of multiple reflections in optical element 11 in the configuration shown in FIG. 3, FIG. 5 shows the relation between the value of "diffraction efficiency η/optical loss α," which is the ratio of diffraction efficiency η at the time of diffraction in hologram 14a and the optical loss α from a particular diffraction to the next diffraction, and the rate of utilization of light, which is the ratio of light that is incident to optical element 11 and all light that is diffracted from polarization-hologram layer 14. As shown in FIG. 5, when the value of "diffraction efficiency η/optical loss α" is set to the order of "8," the rate of utilization of polarization-hologram layer 14 is approximately 90%. Accordingly, if loss α is assumed to be 0.125%, diffraction efficiency η should be set to 1% in order to make the rate of utilization of optical element 11 approximately 90%.

Figure 6:
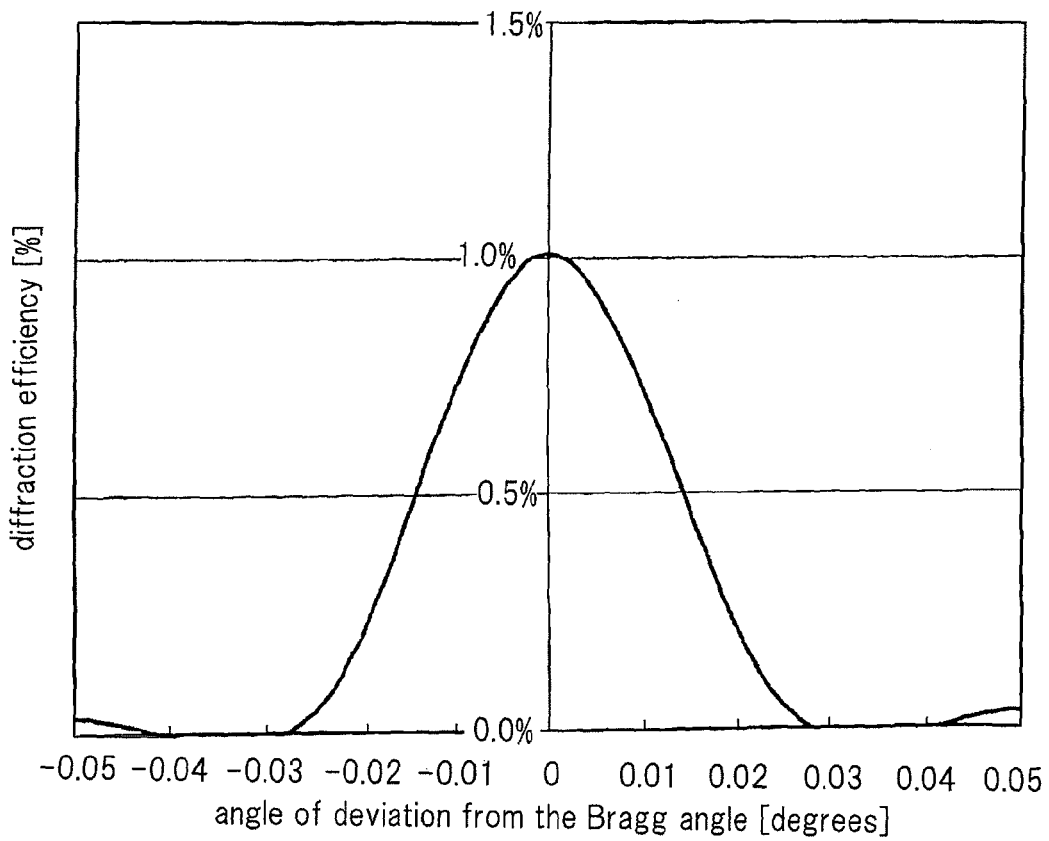
FIG. 6 shows the relation between the angle of divergence from the Bragg angle and the diffraction efficiency in a polarization-hologram layer.

FIG. 6 shows the relation between the angle of deviation from Bragg angle θBragg and the diffraction efficiency in polarization-hologram layer 14. Regarding the calculation conditions, using light of a wavelength of 460 nm, the above-described interference angle θ1 of reference light 20a and signal light 20b is 45 degrees (the angle of incidence θ1 of light that is incident to polarization-hologram layer 14 is 45 degrees), the overall thickness of polarization-hologram layer 14 is 1000 μm, and the refractive index modulation is 1.24e–5. The full width at half maximum is 0.03 degrees, i.e., polarization-hologram layer 14 has angle selectivity that diffracts light of an angle of incidence θ1 that deviates ±0.015 degrees with respect to the Bragg angle θBragg as light having an angular distribution of 0.015 degrees.

Here, M/# (M-number) is known as the performance index for appraising hologram M that is recorded in the hologram medium. M/# of the medium per 1 mm of thickness is represented by Formula 1:

Equation 1

$$M/\# = \sum_M \sqrt{\eta_M}$$ (Formula 1)

As shown in Formula 1, M/# is calculated from the diffraction efficiency in hologram M. When, for example, a photopolymer is used as the hologram medium, M/# on the order of 80-100 can be realized.

Figure 7:
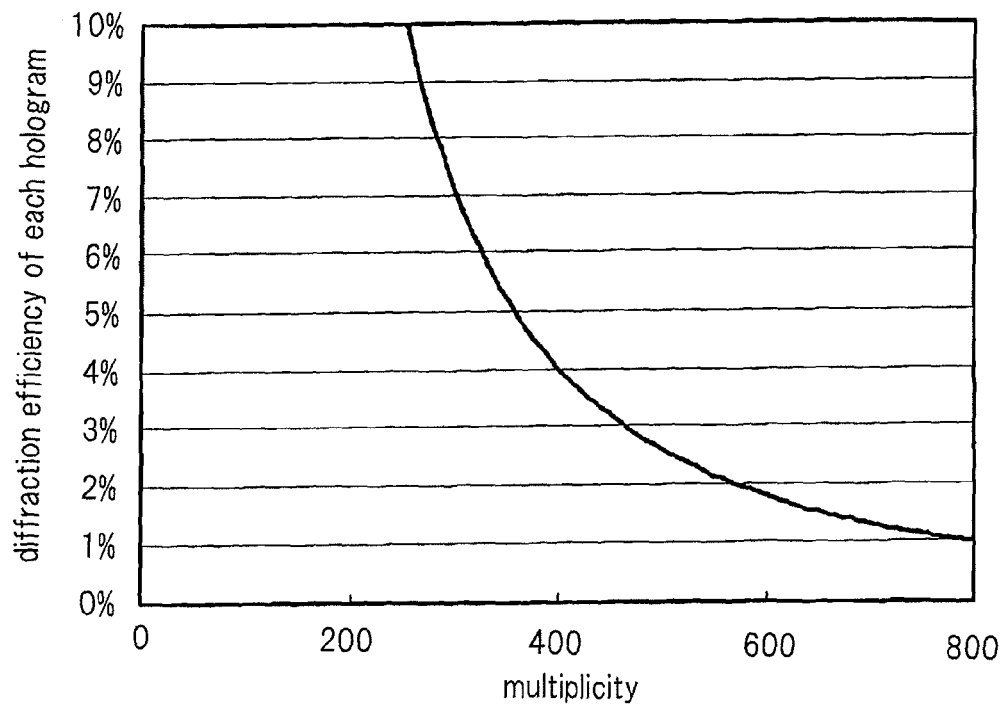
FIG. 7 shows the relation between the multiplicity of holograms and the diffraction efficiency of each hologram in a polarization-hologram layer.

FIG. 7 shows the relation between the multiplicity of holograms 14a and the diffraction efficiency of each hologram in polarization-hologram layer 14. Holograms 14a are calculated as the multiplexed recording in a medium composed of azobenzene in which M/#=80 medium. From FIG. 7, it can be seen that holograms 14a for which the diffraction efficiency for incident light is 1% are capable of a multiplicity of 800, i.e., 800 holograms 14a can be formed superposed on the same surface.

When reference light 20a and signal light 20b are irradiated into the hologram material as described hereinabove, shifting the angle of irradiating signal light 20b and the angle of irradiating reference light 20a by 0.03 degrees 800 times, while holding the interference angle between signal light 20b and reference light 20a fixed without change, produces a plurality of holograms 14a formed by multiplexing in polarization-hologram layer 14. At this time, the angle selectivity realized by all of holograms 14a of polarization-hologram layer 14 is the range of 0.03×800=24 degrees. In other words, polarization-hologram layer 14 diffracts and emits the light of an angle range of 24 degrees in optical element 11 as the light of an angle range of 24 degrees. If the refractive index of optical element 11 is here 1.5 and the refractive index of air outside optical element 11 is 1, the critical angle at the interface of optical element 11 and air is 42 degrees. Accordingly, the angular selectivity of polarization-hologram layer 14 is smaller than the critical angle at the interface of optical element 11 and the air, whereby optical element 11 is capable of raising the directivity of emitted light compared to the configuration described in JPA-2003-207646.

Alternatively, when reference light 20a and signal light 20b are irradiated into the hologram material, polarization-hologram layer 14 may form a plurality of multiplexed holograms 14a by fixing the angle at which signal light 20b is irradiated and shifting the angle of irradiating reference light 20a with respect to signal light 20b 800 times. By forming a plurality of holograms 14a in this way, light of different angles of incidence can be diffracted in a range of angles that accords with angular selectivity of each of holograms 14a. At this time, the interference angle between signal light 20b and reference light 20a at the time of producing holograms 14a is within the range of 0 degrees<interference angle<90 degrees. In this range, the angular selectivity narrows as the interference angle increases. Thus, when the interference angle of all holograms 14a is made greater than 45 degrees, the distribution of diffraction angles is narrower than for a case in which all holograms 14a are produced at an interference angle of 45 degrees, and the angular selectivity of all holograms 14a therefore becomes smaller than 0.03 degrees.

Reducing the thickness of polarization-hologram layer 14 can broaden the angle selection range of polarization-hologram layer 14. However, when the angle selection range is broadened, the diffraction efficiency of polarization-hologram layer 14 drops and optical loss increases. As a result, the characteristics of polarization-hologram layer 14 are set as appropriate by balancing angular selectivity against optical loss.

In addition, increasing the multiplicity of holograms 14a can broaden the angle selection range of polarization-hologram layer 14. However, when the angle selection range is broadened, the diffraction efficiency of polarization-hologram layer 14 drops and optical loss increases. As a result, the characteristics of polarization-hologram layer 14 are set as appropriate by balancing angular selectivity against optical loss.

Phase-difference layer 17 equipped in optical element 11 is provided on second surface 12c of light guide body 12. Phase-difference layer 17 employs a quarter-wave plate and imparts a phase difference of 90 degrees to mutually orthogonal polarization components that belong to light that is transmitted through phase-difference layer 17. Accordingly, light that is irradiated into phase-difference layer 17 from light guide body 12 is transmitted through phase-difference layer 17, is reflected by reflection layer 18, is again transmitted through phase-difference layer 17, and thus is given a phase difference of 180 degrees and undergoes polarization conversion. In the present exemplary embodiment, phase-difference layer 17 is provided on second surface 12c of light guide body 12, but phase-difference layer 17 is not limited to this configuration and can be provided inside light guide body 12.

Reflection layer 18 that is provided in optical element 11 is provided on phase-difference layer 17 on the side opposite second surface 12c of light guide body 12. A metal film composed of a metal material such as silver or aluminum or a dielectric multilayer film is used as reflection layer 18. In addition, although not shown in the figure, reflection layer 18 may have an uneven structure that has a light-scattering action or scatterers such as granules may be provided. When a structure having a light-scattering action is provided, the polarized state of light is altered during scattering and undergoes polarization conversion in the process of multiple reflection in light guide body 12, whereby phase-difference layer 17 need not be provided in light guide body 12.

Regarding light source device 1 of the first exemplary embodiment that is configured as described above, the action of emitting from optical element 11 the light that was irradiated into optical element 11 from light-emitting element 10 is next described.

As shown in FIG. 3, the light that is emitted from light-emitting element 10 is irradiated from light-incidence surface 12a of light guide body 12 and propagated through light guide body 12 while undergoing multiple reflection in light guide body 12. At this time, only the X-polarized light that is one of the polarization components of incident light from light-emitting element 10 is transmitted through first polarization-separation layer 13, and the Y-polarized light that is the other polarization component of the incident light is reflected by first polarization-separation layer 13.

The X-polarized light that is transmitted through first polarization-separation layer 13 is irradiated into polarization-hologram layer 14. Of the light that is irradiated into polarization-hologram layer 14, X-polarized light of a predetermined angle of incidence θ1 is diffracted by the Bragg angle θBragg with respect to wave vector K by hologram 14a, and moreover, converted to Y-polarized light. Polarization-hologram layer 14 in the present exemplary embodiment has the above-described angle selection range, whereby X-polarized light that is incident to polarization-hologram layer 14 within a predetermined range of angles of incidence is diffracted by the Bragg angle θBragg from wave vector K of each of holograms 14a of multiplexed holograms 14a, and moreover, is converted to Y-polarized light. Accordingly, X-polarized light that is incident to polarization-hologram layer 14 within a predetermined range of angles of incidence is emitted as Y-polarized light from polarization-hologram layer 14 at a predetermined range of angles of emission.

X-polarized light that is incident to polarization-hologram layer 14 at angle of incidence θ2 that is outside the predetermined range of angles of incidence is transmitted through polarization-hologram layer 14 without undergoing diffraction and polarization conversion.

The Y-polarized light that is emitted from polarization-hologram layer 14 is transmitted through second polarization-separation layer 15 and is emitted as emitted light from optical element 11. In other words, emitted light for which directivity has been raised by the angular selectivity of polarization-hologram layer 14 is emitted from optical element 11.

In addition, X-polarized light that is transmitted through polarization-hologram layer 14 is reflected by second polarization-separation layer 15. The X-polarized light that is reflected by second polarization-separation layer 15 is transmitted through polarization-hologram layer 14 and first polarization-separation layer 13 and returns into light guide body 12.

On the other hand, of the light that is incident to light guide body 12 from light-emitting element 10, Y-polarized light that is reflected by first polarization-separation layer 13 is irradiated into phase-difference layer 17. Y-polarized light that is incident to phase-difference layer 17 from light guide body 12 is transmitted through phase-difference layer 17, and after being reflected by reflection layer 18, is again transmitted through phase-difference layer 17, whereby a phase difference of 180 degrees is imparted to the mutually orthogonal polarization components belonging to the transmitted light. Accordingly, the Y-polarized light that is irradiated into phase-difference layer 17 from light guide body 12 is reflected by reflection layer 18, converted to X-polarized light, and then returned into light guide body 12. Similarly, the X-polarized light that is reflected by the second polarization-separation layer 15 as described hereinabove and then returned into light guide body 12 is irradiated into phase-difference layer 17, reflected by reflection layer 18, and returned into light guide body 12 as Y-polarized light from phase-difference layer 17.

In polarization-hologram layer 14 in the above-described exemplary embodiment, a plurality of holograms 14a are formed by multiplexing, i.e., superposed, but when necessary, a plurality of holograms 14a may be formed in multiple layers, i.e., in laminations.

As described hereinabove, optical element 11 of light source device 1 of the first exemplary embodiment is able to use the angular selectivity possessed by polarization-hologram layer 14 to narrow the solid angle of emitted light from optical element 11 and increase directivity. In optical element 11 of the first exemplary embodiment, the rate of utilization of light having a broad-band angular distribution from light-emitting element 10 is increased through the use of polarization-hologram layer 14 in which the diffraction efficiency of holograms is lowered and holograms 14a are multiplexed that have a narrow-band incident-angle (emission-angle) distribution. Accordingly, optical element 11 is able to convert light irradiated into optical element 11 from light-emitting element 10 to linearly polarized light in which the polarization direction is a specific direction, and moreover, generate emission light of high directivity with high efficiency.

The light source devices of other exemplary embodiments are next described. The light source devices of the other exemplary embodiments differ from the light source device of the first exemplary embodiment only with regard to the configuration of the optical element. In the optical elements in the other exemplary embodiments, constituent parts that are identical to parts in the first exemplary embodiment are given the same reference numbers as in the first exemplary embodiment and redundant explanation is omitted.

Second Exemplary Embodiment

Figure 8:
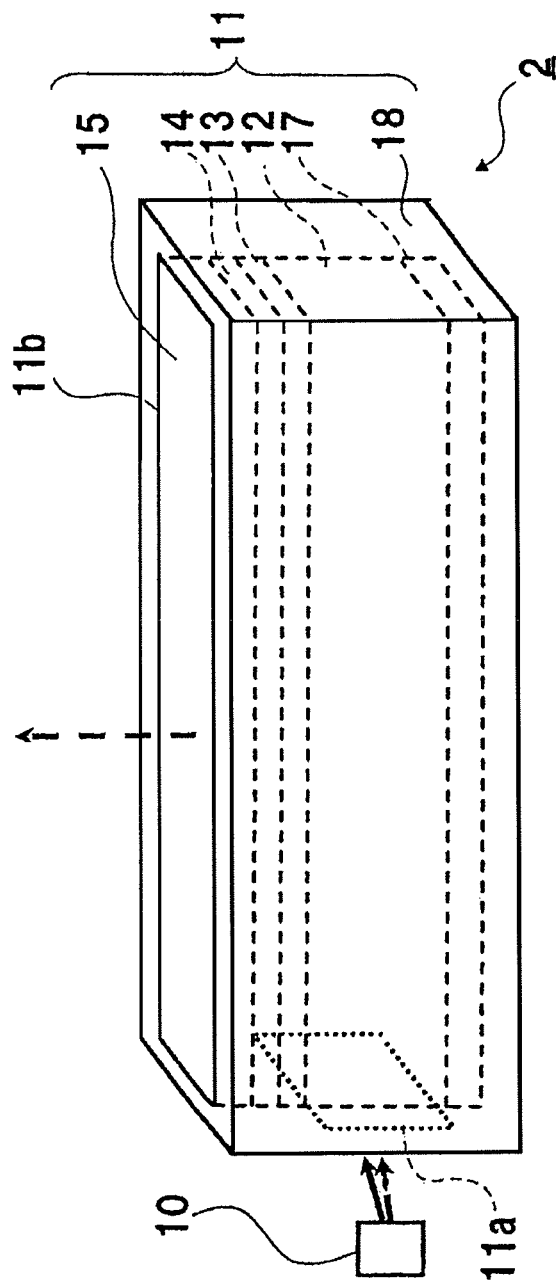
FIG. 8 is a perspective view giving a schematic representation of the light source device of the second exemplary embodiment.
Figure 9:
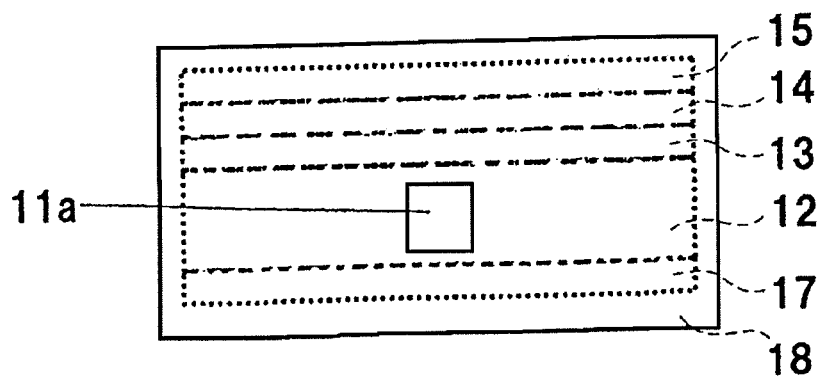
FIG. 9 is a side view giving a schematic representation from the light-emitting element side of the light source device of the second exemplary embodiment.

FIG. 8 shows a perspective view of the light source device of the second exemplary embodiment. FIG. 9 is a side view showing the light source device of the second exemplary embodiment from the light-emitting element side.

As shown in FIGS. 8 and 9, light source device 2 of the second exemplary embodiment differs from the first exemplary embodiment in that reflection layer 18 of optical element 11 in the previously described first exemplary embodiment is formed so as to cover other surfaces of optical element 11.

Reflection layer 18 is formed to cover all surfaces, with the exception of an aperture as light-incidence portion 11a at which light from light-emitting element 10 is irradiated, and with the exception of light emission portion 11b of optical element 11.

According to the light source device of the second exemplary embodiment, the provision of reflection layer 18 around the periphery of optical element 11 with the exception of light-incidence portion 11a and light-emission portion 11b enables a further increase of the rate of utilization of light that is irradiated into light guide body 12 from light-emitting element 10.

In the second exemplary embodiment, reflection layer 18 is formed over the side surfaces of optical element 11, but reflection layer 18 may also be formed only on light guide body 12 such that reflection layer 18 covers surfaces of the periphery of light guide body 12 other than light-incidence portion 11a and the interface with first polarization-separation layer 13.

Third Exemplary Embodiment

Figure 10:
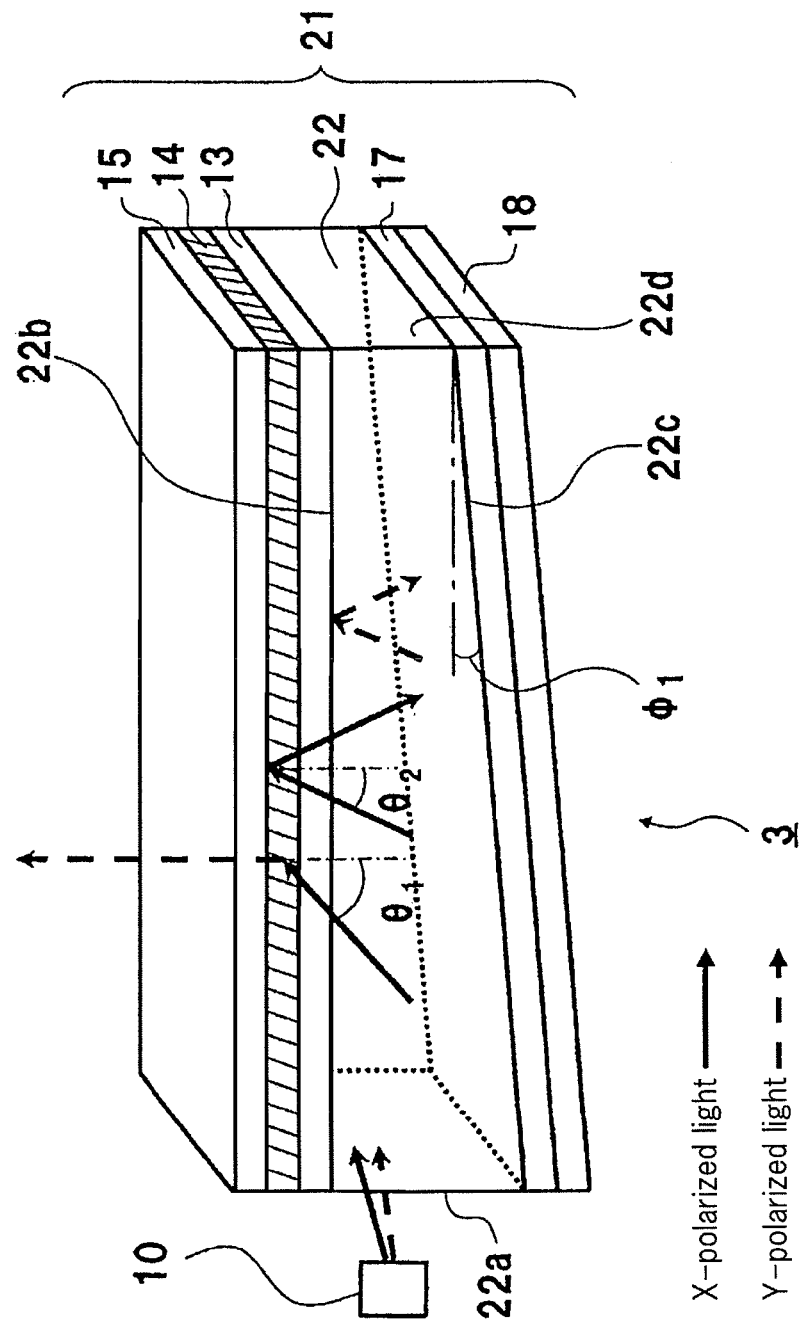
FIG. 10 is a perspective view giving a schematic representation of the light source device of the third exemplary embodiment.
Figure 11:
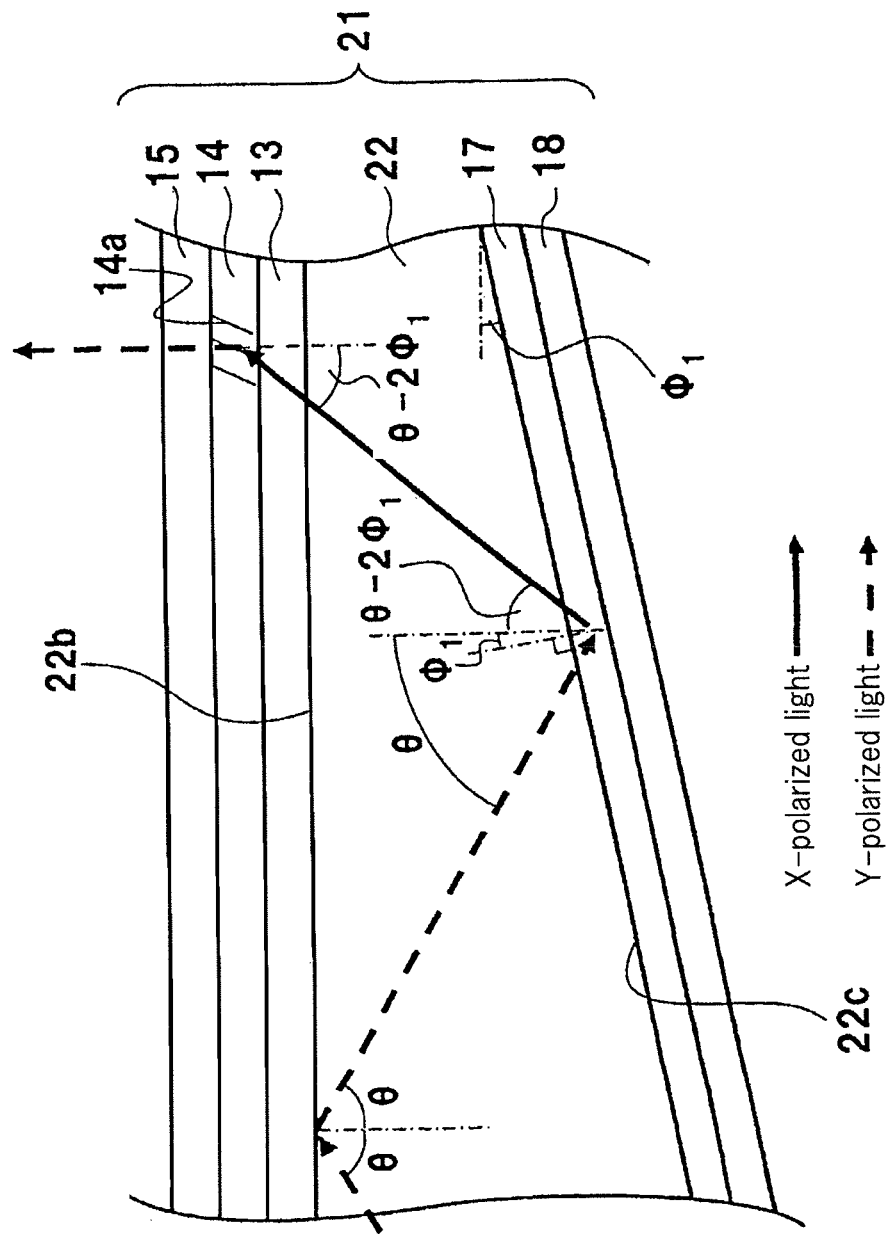
FIG. 11 is a schematic view for describing the behavior of light in the light guide body of the light source device of the third exemplary embodiment.

FIG. 10 shows a perspective view of the light source device of the third exemplary embodiment. FIG. 11 gives a schematic representation for explaining the behavior of light in the light guide body of the light source device of the third exemplary embodiment. As shown in FIG. 10, light source device 3 of the third exemplary embodiment differs from the first exemplary embodiment with regard to the shape of light guide body 12 of optical element 11 of the previously described first exemplary embodiment.

Optical element 21 that is provided in light source device 3 of the third exemplary embodiment is provided with light guide body 22 in which light-incidence surface 22a is formed into which light from light-emitting element 10 is irradiated. As shown in FIG. 10 and FIG. 11, this light guide body 22 is formed in a trapezoidal shape and includes first surface 22b on which first polarization-separation layer 13 is laminated, second surface 22c that is opposite this first surface 22b, and third surface 22d that is opposite light-incidence surface 22a. Second surface 22c of light guide body 22 is inclined such that the thickness of light guide body 22 gradually decreases from the side of light-incidence surface 22a toward the side of third surface 22d, this surface being inclined at an angle of inclination $\phi 1$ with respect to a plane parallel to first surface 22b. In addition, phase-difference layer 17 and reflection layer 18 are formed laminated on second surface 22c of light guide body 22.

Referring to FIG. 11, explanation next regards the behavior of Y-polarized light that is reflected by first polarization-separation layer 13 in light guide body 22 of optical element 21 that is configured as described hereinabove.

As shown in FIG. 11, Y-polarized light that is irradiated into light guide body 22 from light-emitting element 10 and irradiated into first polarization-separation layer 13 at an angle of incidence $\theta$ is reflected by first polarization-separation layer 13 at an angle of reflection $\theta$. The Y-polarized light that was reflected by first polarization-separation layer 13 is then irradiated at an angle $\theta$ with respect to the normal line of first surface 22b into phase-difference layer 17 that comes into contact with second surface 22c.

Here, due to the angle of inclination $\theta$ of second surface 22c, the Y-polarized light that is irradiated into phase-difference layer 17 is both converted to X-polarized light by phase-difference layer 17 and reflection layer 18 and emitted from phase-difference layer 17 that comes into contact with second surface 22c at an angle of ($\theta-2\phi 1$) with respect to the normal line of first surface 22b.

As a result, the X-polarized light that is emitted from phase-difference layer 17 is irradiated into first polarization-separation layer 13 at an angle of incidence ($\theta-2\phi 1$) that is smaller than the above-described angle of incidence $\theta$. Accordingly, the X-polarized light that is irradiated into first polarization-separation layer 13 at an angle of incidence ($\theta-2\phi 1$) is transmitted through first polarization-separation layer 13 and irradiated into polarization-hologram layer 14 at an angle of incidence ($\theta-2\phi 1$).

According to light source device 3 of the third exemplary embodiment, due to the provision of light guide body 22 that has second surface 22c that is inclined with respect to a plane parallel to first surface 22b, following the conversion of Y-polarized light that is reflected by first polarization-separation layer 13 to X-polarized light by phase-difference layer 17 and reflection layer 18, the angle of incidence $\theta$ of irradiation into polarization-hologram layer 14 can be reduced according to angle of inclination $\phi 1$ of second surface 22c of light guide body 22. Accordingly, due to optical element 21 of light source device 3, light of an angle of incidence that exceeds the angle-selection range of polarization-hologram layer 14 is converted to light of an angle of incidence within the angle-selection range of polarization-hologram layer 14, thereby enabling an improvement in the rate of utilization of polarization-hologram layer 14 and an improvement of the rate of utilization of light from light-emitting element 10.

In the third exemplary embodiment, second surface 22c of light guide body 22 is formed as an inclined surface whereby the thickness of light guide body 22 decreases from the side of light-incidence surface 22a toward the side of third surface 22d, but second surface 22c may be formed as an inclined surface whereby the thickness of light guide body 22 gradually increases from the side of light-incidence surface 22a toward the side of third surface 22d. Still further, second surface 22c of light guide body 22 is not limited to a configuration that inclines in a direction parallel to the optical axis of light-emitting element 10 and may be inclined in a direction orthogonal to the optical axis of light-emitting element 10.

In the third exemplary embodiment, as in the second exemplary embodiment, reflection layer 18 may be provided to cover surfaces other than the light-incidence portion and light-emission portion of optical element 21 and thus enable a still greater increase of the rate of utilization of light from light-emitting element 10.

Fourth Exemplary Embodiment

Figure 12:
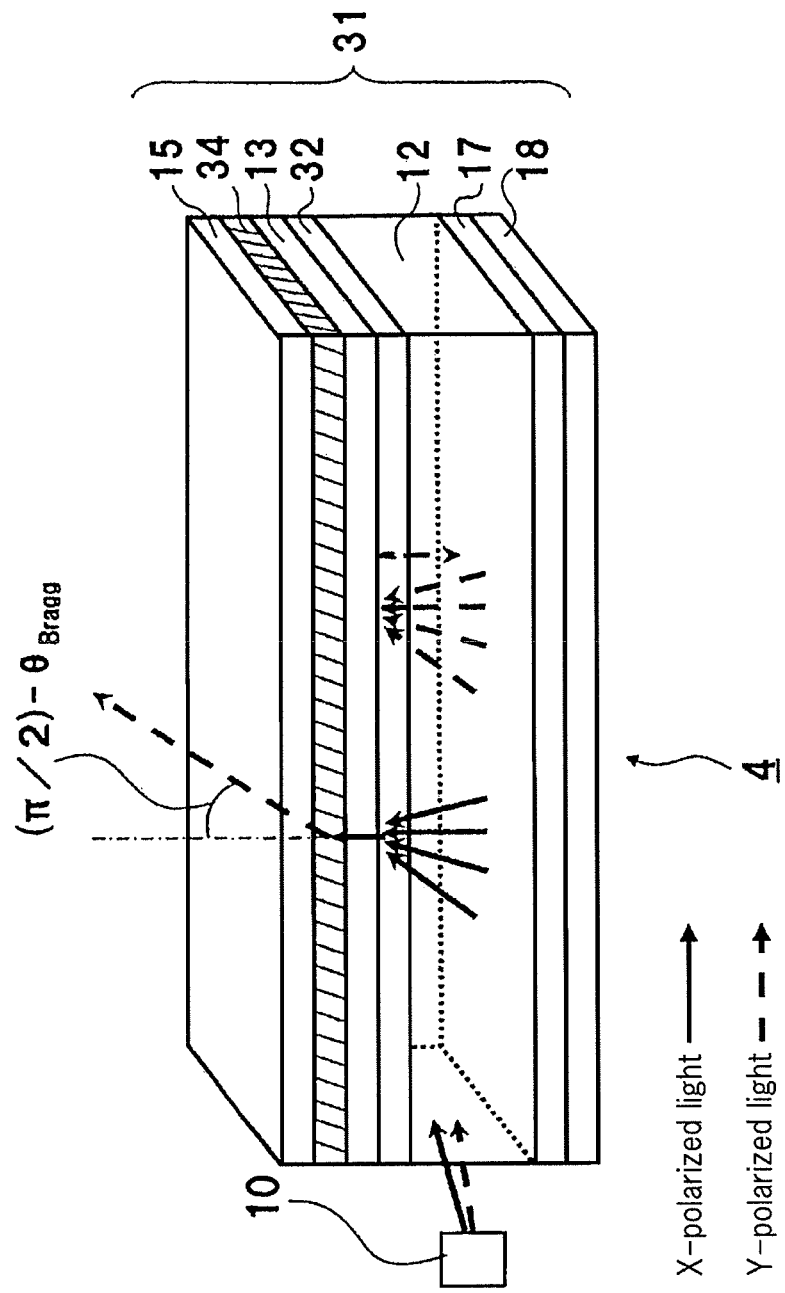
FIG. 12 is a perspective view giving a schematic representation of the light source device of the fourth exemplary embodiment.

FIG. 12 shows a perspective view of the light source device of the fourth exemplary embodiment. As shown in FIG. 12, light source device 4 of the fourth exemplary embodiment differs from the first exemplary embodiment in that light propagation direction conversion layer 32 has been added to optical element 11 in the first exemplary embodiment. Here, the angle of incidence and the angle of emission of light to light propagation direction conversion layer 32 are angles that incline with respect to a direction orthogonal to the interface of light propagation direction conversion layer 32 with light guide body 12. In other words, the angle of incidence and angle of emission of light that is orthogonal to the interface of light propagation direction conversion layer 32 with light guide body 12 is assumed to be 0 degrees.

Optical element 31 in light source device 4 of the fourth exemplary embodiment is provided with light propagation direction conversion layer 32 between light guide body 12 and first polarization-separation layer 13 that converts light irradiated from light guide body 12 to a predetermined angle of emission and emits the light to first polarization-separation layer 13. In other words, light propagation direction conversion layer 32 diffracts X-polarized light and Y-polarized light as the polarization components of light irradiated from light guide body 12 and emits at a predetermined angle of emission of, for example, 0 degrees.

Optical element 31 in the fourth exemplary embodiment adopts a configuration that is provided with light propagation direction conversion layer 32, and polarization-hologram layer 34 is therefore provided that diffracts light that is irradiated at an angle of incidence of 0 degrees from light propagation direction conversion layer 32 and emits the diffracted light at an angle of emission angle $\{(\pi/2)-\theta Bragg\}$.

Figure 13A:
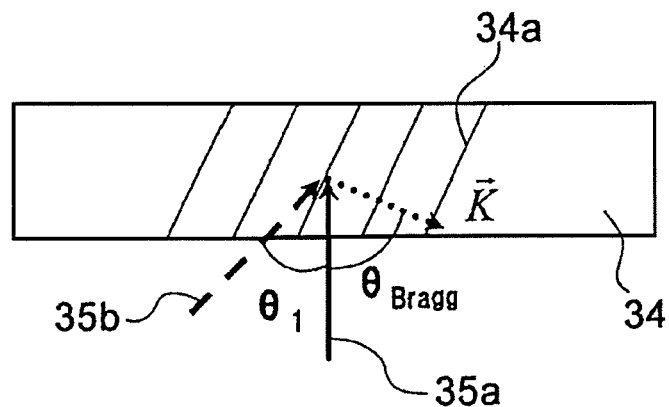
FIG. 13A is a schematic view for describing the hologram forming process of the polarization-hologram layer that is provided in the light source device of the fourth exemplary embodiment.
Figure 13B:
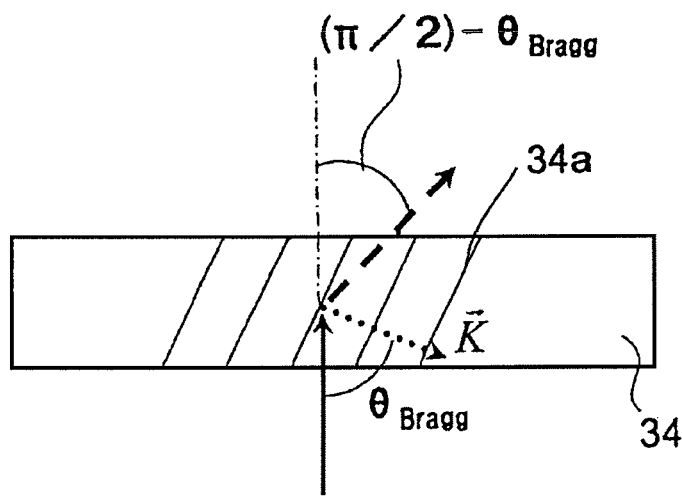
FIG. 13B is a schematic view for describing the diffraction action when the angle of incidence of light that is incident to the polarization-hologram layer satisfies the Bragg diffraction conditions in the fourth exemplary embodiment.
Figure 13C:
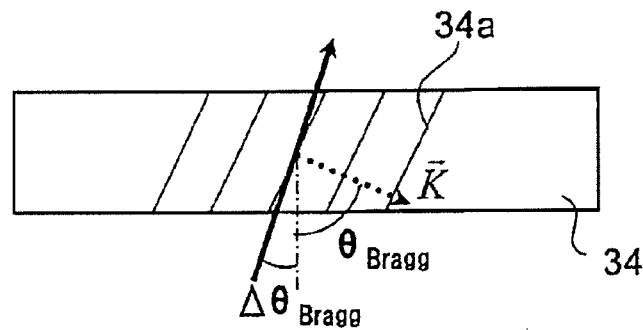
FIG. 13C is a schematic view for describing a case in which the angle of incidence of light incident to the polarization-hologram layer does not satisfy the Bragg diffraction conditions in the fourth exemplary embodiment.

FIGS. 13A-13C show schematic views for describing the hologram formation process and diffraction action of polarization-hologram layer 34 that is provided in the light source device of the fourth exemplary embodiment. FIG. 13A is a schematic view for describing the hologram formation process. FIG. 13B is a schematic view for describing the diffraction action when the angle of incidence of light irradiated into polarization-hologram layer 34 satisfies the Bragg diffraction conditions. FIG. 13C is a schematic view for describing a case in which the angle of incidence of light irradiated into polarization-hologram layer 34 does not satisfy the Bragg diffraction conditions.

As shown in FIG. 13A, reference light 35a and signal light 35b are each irradiated into the hologram material that forms hologram layer 34 so as to form a predetermined interference angle θ1. Here, X-polarized light is irradiated as reference light 35a at an angle of incidence of 0 degrees with respect to the hologram material, and Y-polarized light is irradiated as signal light 35b at an angle of incidence (interference angle) of θ1 to form desired holograms 34a.

As shown in FIG. 13B, the formation of holograms 34a in this way causes X-polarized light that is irradiated at an angle of incidence of 0 degrees with respect to the interface of polarization-hologram layer 34 to be both diffracted at the Bragg angle θBragg with respect to wave vector K and converted to Y-polarized light when the angle of incidence of light that is irradiated into polarization-hologram layer 34 satisfies the Bragg diffraction conditions. This Y-polarized light is emitted from polarization-hologram layer 34 at an angle of emission angle $\{(\pi/2)-\theta Bragg\}$.

As shown in FIG. 13C, when the angle of incidence of light that is irradiated into polarization-hologram layer 34 does not satisfy the Bragg diffraction conditions, X-polarized light that is irradiated at an angle of incidence ΔθBragg with respect to the interface of polarization-hologram layer 34 is transmitted through polarization-hologram layer 34 without being diffracted by holograms 34a, and further, without being converted to Y-polarized light. Accordingly, light that is irradiated into polarization-hologram layer 34 at an angle of incidence of ΔθBragg is emitted from polarization-hologram layer 34 at an angle of emission angle ΔθBragg.

Figure 14:
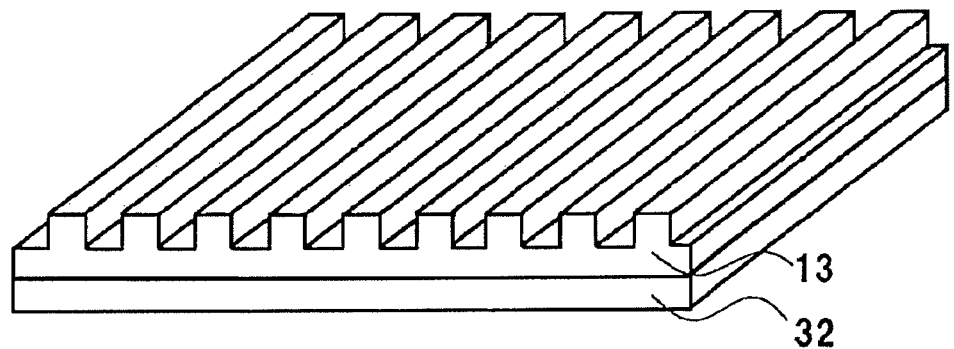
FIG. 14 is a perspective view giving a schematic representation of the first polarization-separation layer and light propagation direction conversion layer that are provided in the light source device of the fourth exemplary embodiment.
Figure 15:
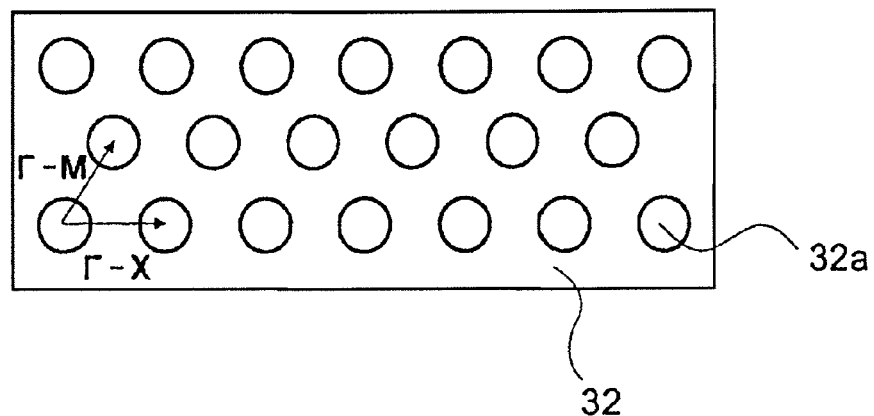
FIG. 15 is a plan view giving a schematic representation of the light propagation direction conversion layer that is provided in the light source device of the fourth exemplary embodiment.

FIG. 14 is a perspective view giving a schematic representation of the first polarization-separation layer and light propagation direction conversion layer provided in the light source device of the fourth exemplary embodiment. FIG. 15 is a plan view giving a schematic representation of the light propagation direction conversion layer provided in the light source device of the fourth exemplary embodiment.

As shown in FIG. 14, first polarization-separation layer 13 is provided with a surface lattice structure on the interface with polarization-hologram layer 34. First polarization-separation layer 13 transmits X-polarized light that is irradiated at an angle of incidence of 0 degrees from light propagation direction conversion layer 32, and moreover, reflects Y-polarized light that is irradiated at an angle of incidence of 0 degrees from light propagation direction conversion layer 32.

As shown in FIG. 15, light propagation direction conversion layer 32 employs a two-dimensional photonic crystal in which the crystalline structure has a triangular lattice structure. Light propagation direction conversion layer 32 has periodic structure 32a in which the angle formed by two reciprocal lattice vectors Γ–M and Γ–X is 60 degrees and triangular lattice shapes are arranged. Periodic structure 32a is formed by cylindrical protrusions or holes.

According to optical element 31 in the fourth exemplary embodiment, the provision of light propagation direction conversion layer 32 that converts light from light guide body 12 to a predetermined angle of emission and emits the result narrows the range of the angle of incidence of light that is irradiated into polarization-hologram layer 34. As a result, the light from light guide body 12 can be efficiently directed into polarization-hologram layer 34 as light that satisfies the Bragg diffraction conditions. Accordingly, optical element 31 of light source device 4 can achieve a still greater improvement of the rate of utilization of light from light-emitting element 10.

In the fourth exemplary embodiment, as in the second exemplary embodiment, reflection layer 18 may be provided to cover surfaces other than the light-incidence portion and light-emission portion of optical element 31 to enable a further increase in the utilization rate of light from light-emitting element 10.

In addition, in the above-described first to fourth exemplary embodiments, configurations have been described in which the polarization-hologram layer diffracts the X-polarized light that is irradiated into the polarization-hologram layer and converts the X-polarized light to Y-polarized light. However, conversely to this configuration, a configuration may of course be adopted in which the polarization-hologram layer diffracts Y-polarized light that is irradiated and converts the Y-polarized light to X-polarized light. In the case of such a configuration, the first and second polarization-separation layers are similarly configured to transmit polarization of a direction orthogonal to the polarization that first and second polarization-separation layers 13 and 15 transmit in the above-described first to fourth exemplary embodiments.

The light source device of the present exemplary embodiment is appropriate for use as the light source device of an image display device and may be used in electronic equipment such as a light source device that is provided in a projection-type display device, a light source device for a direct backlit liquid crystal display panel (LCD), or as a backlight of a portable telephone or a PDA (Personal Data Assistant).

Figure 16:
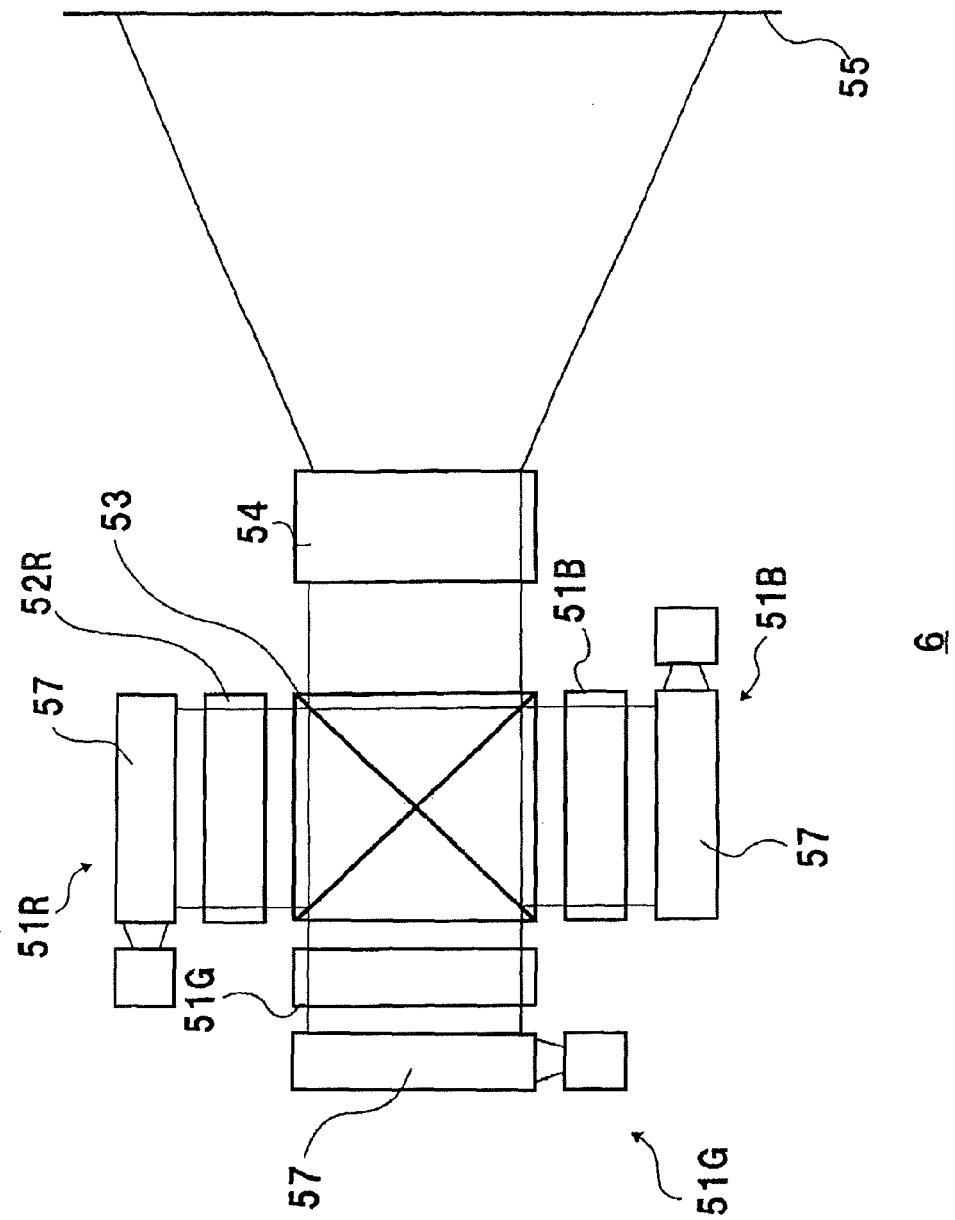
FIG. 16 is a plan view giving a schematic representation of the LED projector of an exemplary embodiment.

Finally, an example of a configuration of an LED projector is described with reference to accompanying drawings as a projection-type display device in which the light source device of the above-described first to fourth exemplary embodiments is applied. FIG. 16 is a schematic view of an LED projector of an exemplary embodiment.

As shown in FIG. 16, LED projector 6 of the exemplary embodiment is provided with: red (R) light source device 51R; green (G) light source device 51G; blue (B) light source device 51B; liquid crystal display panels 52R, 52G and 52B as display elements into which the emitted light, from these light source devices 51R, 51G and 51B, respectively enters; cross-dichroic prism 53, that combines R, G and B light, to which is imparted respective image information by these liquid crystal display panels 52R, 52G and 52B, and into which R, G and B light enter; projection optics 54 that include a projection lens (not shown) that projects light emitted from this cross-dichroic prism 53 onto a projection surface 55 such as a screen. In this LED projector 6, a simultaneous additive mixture of color stimuli method is adopted and a configuration similar to a three-panel liquid crystal projector is adopted.

FIG. 16 is a plan view showing R light source device 51R that is provided in LED projector 6 of the exemplary embodiment. The configuration of R light source device 51R is described as one example, but G light source device 51G and B light source device 51B are configured similarly to R light source device 51R.

Figure 17:
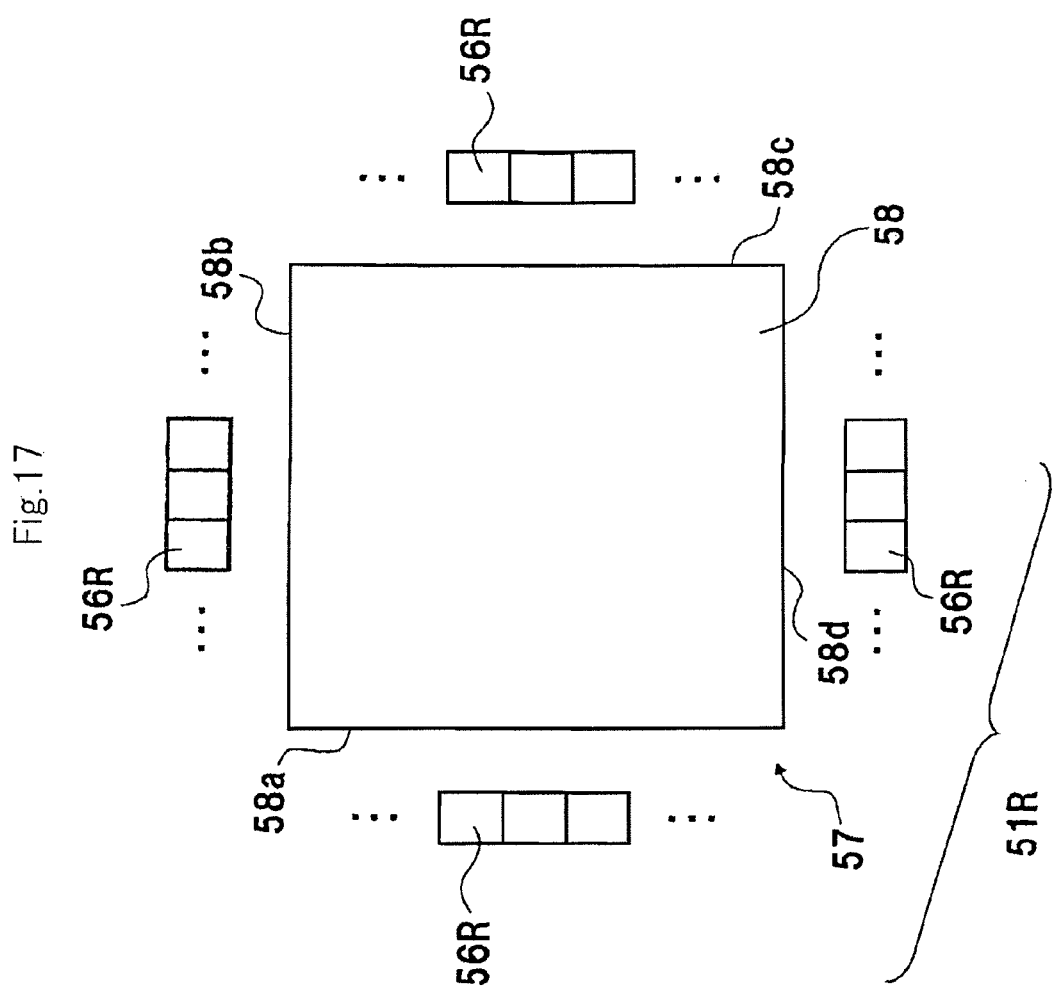
FIG. 17 is a plan view giving a schematic representation of the light source device that is provided in the LED projector of an exemplary embodiment.

As shown in FIG. 17, R light source device 51R is provided with: a plurality of R LEDs 56R as light-emitting elements, and optical element 57 into which light from these R LEDs 56R is irradiated. Light guide body 58 belonging to optical element 57 is formed in a plate shape in which the main surface is a square, a plurality of R LEDs 56R being arranged at opposing positions on each of four peripheral side surfaces 58a-58d.

This optical element 57 is configured similarly to optical elements 11, 21, and 31 in the above-described exemplary embodiments.

In light guide body 58 of optical element 57, the light from the plurality of R LEDs 56R is irradiated from each of side surfaces 58a-58d, whereby light of differing directions of incidence is irradiated to light guide body 58. As a result, the polarization-hologram layer (not shown) that belongs to optical element 57 in this exemplary embodiment has four types of holograms corresponding to each light whose direction of incident to light guide body 58 is different. These holograms are formed by multiplexing but of course may also be formed in multiple layers.

According to LED projector 6 of the present exemplary embodiment, the provision of light source devices 51R, 51G and 51B in which a light source device of the above-described exemplary embodiments is applied enables an improvement in the luminance of a projected image.

Figure 18:
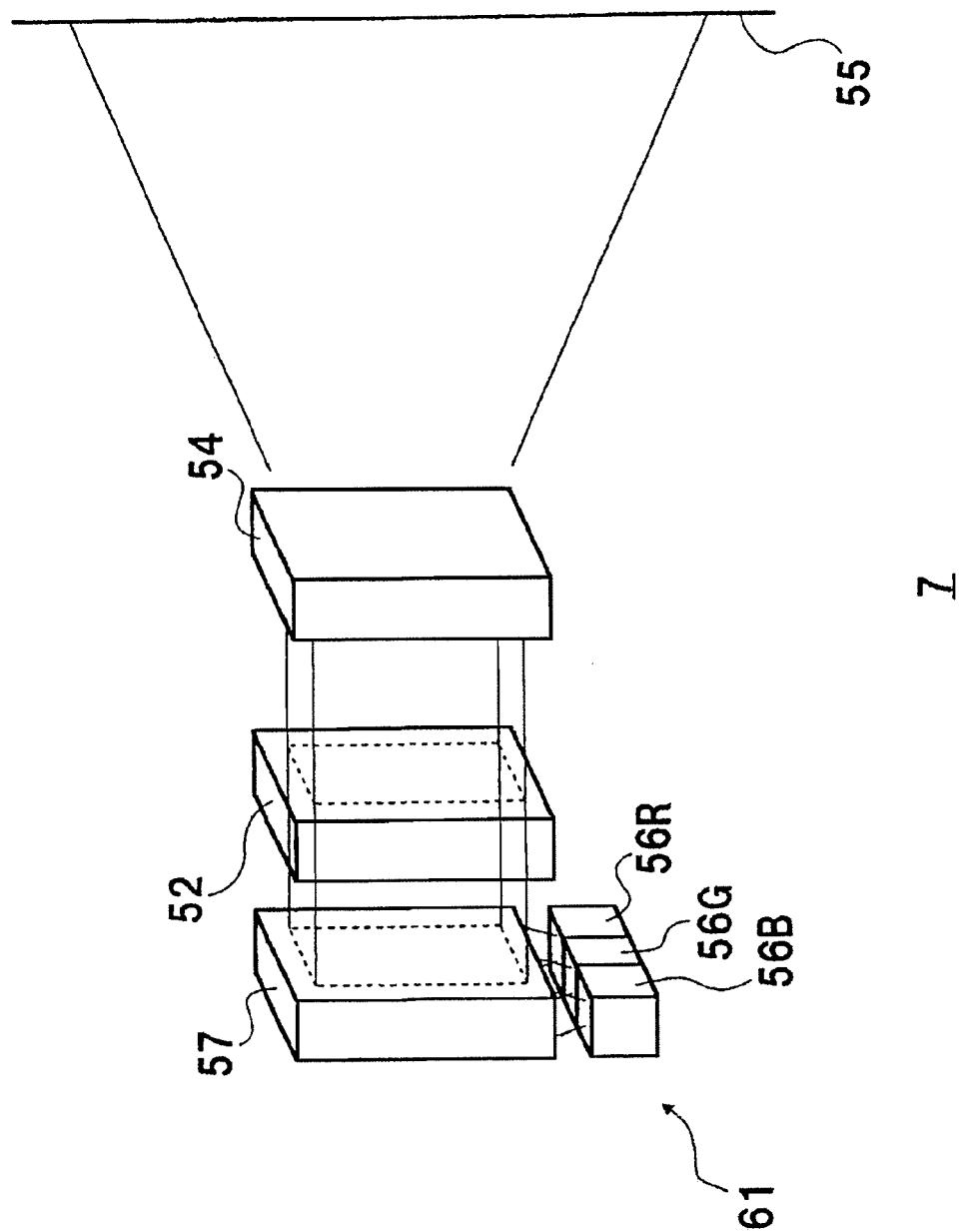
FIG. 18 is a perspective view giving a schematic representation of the LED projector of another exemplary embodiment.

FIG. 18 is a schematic view of an LED projector of another exemplary embodiment. As shown in FIG. 18, LED projector 7 of this exemplary embodiment is provided with: light source device 61, liquid crystal display panel 52 into which the emitted light from this light source device 61 is irradiated, and projection optics that includes a projection lens (not shown) that projects the emitted light from this liquid crystal display panel 52 onto projection surface 55 such as a screen.

In light source device 61 that is provided in LED projector 7, R LED 56R, G light-emitting element 56G, and B light-emitting element 56B are arranged on one side surface of light guide body 58 of optical element 57. In this LED projector 7, a time-division method is adopted, and control circuit unit (not shown) implements switching such that only one LED from among R LED 56R, G LED 56G and B LED 56B emits light.

Alternatively, light from R LED 56R, G LED 56G and B LED 56B in which the emitted optical wavelengths differ, is irradiated into light guide body 58 of optical element 57. As a result, polarization-hologram layer (not shown) that belongs to optical element 57 in this exemplary embodiment has three types of holograms corresponding to the light of each of the different emitting optical wavelengths from R LED 56R, G LED 56G and B LED 56B. Although these holograms are formed by multiplexing, they may of course also be formed in multiple layers.

Alternatively, light from a plurality of R LEDs 56R, G LEDs 56G, B LEDs 56B may be irradiated into light guide body 58 of optical element 57 from four side surfaces 58a-58d on the periphery of light guide body 58 as shown in FIG. 17. In the case of this configuration, polarization-hologram layer (not shown) that belongs to optical element 57 has 12 types of holograms corresponding to each light whose direction (four directions) of incident to light guide body 58 is different and wavelengths (three wavelengths). These holograms may be formed by multiplexing, or may be formed in multiple layers.

According to LED projector 7 of the present exemplary embodiment, the provision of light source device 61, in which a light source device of the above-described exemplary embodiments is applied, enables an improvement of the luminance of the projected image.

Although the present invention has been described with reference to exemplary embodiments, the present invention is not limited to the above-described exemplary embodiments. The configuration and details of the present invention are open to various modifications within the scope of the present invention that will be clear to one of ordinary skill in the art.

This application claims the benefits of priority based on Japanese Patent Application No. 2009-231454 for which application was submitted on Oct. 5, 2009 and incorporates by citation all of the disclosures of that application.

The invention claimed is:

1. An optical element comprising:
    a light guide body into which light is irradiated from a light source, said light guide body having a first surface and a second surface that is opposite the first surface;
    a first polarization-separation layer that is laminated on said first surface of said light guide body, said first polarization-separation layer transmitting, of light irradiated from said light guide body, first linearly polarized light in which a polarization component is of a specific direction, and that reflects second linearly polarized light in which a polarization component is of a direction orthogonal to the first linearly polarized light;
    a polarization-hologram layer that is laminated on said first polarization-separation layer and that both diffracts said first linearly polarized light that is irradiated within a predetermined range of angles of incidence to a predetermined angle of diffraction and converts said first linearly polarized light to second linearly polarized light;
    a second polarization-separation layer that is laminated on said polarization-hologram layer and that transmits, of light irradiated from said polarization-hologram layer, said second linearly polarized light, and moreover, that reflects said first linearly polarized light;
    a reflection layer that is provided on said second surface side of said light guide body; and
    a phase-difference layer that is provided between said first surface of said light guide body and said reflection layer and that imparts a phase difference to mutually orthogonal polarization components belonging to incident light before and after transmission of said incident light.

2. The optical element according to claim 1, wherein, in said polarization-hologram layer, a plurality of holograms are formed by multiplexing that diffract in said predetermined diffraction angle said first linearly polarized light that is irradiated at each of different angles of incidence.

3. The optical element according to claim 1, wherein, in said polarization-hologram layer, a plurality of holograms are formed in multiple layers that diffract, in said predetermined diffraction angle, said first linearly polarized light that is irradiated at each of different angles of incidence.

4. The optical element according to claim 1, wherein said polarization-hologram layer has a plurality of types of holograms corresponding to light of each of different light emission wavelengths.

5. The optical element according to claim 1, wherein said polarization-hologram layer has a plurality of types of holograms corresponding to each light whose direction of incident to said light guide body is different.

6. The optical element according to claim 1, wherein said reflection layer is constituted by including a scatterer.

7. The optical element according to claim 1, further comprising a light propagation direction conversion layer that is provided between said light guide body and said first polarization-separation layer and that converts light from said light guide body to light of a predetermined angle of emission and emits the converted light to said first polarization-separation layer.

8. The optical element according to claim 7, wherein said light propagation direction conversion layer has a periodic structure.

9. The optical element according to claim 8, wherein said light propagation direction conversion layer is composed of photonic crystal.

10. The optical element according to claim 1, wherein at least one of said first polarization-separation layer and said second polarization-separation layer has a periodic structure.

11. The optical element according to claim 10, wherein at least one of said first polarization-separation layer and said second polarization-separation layer is composed of photonic crystal.

12. The optical element according to claim 1, wherein said reflection layer is provided to cover all surfaces of said light guide body other than a light-incidence portion into which light from said light source enters and other than a light-emission portion of said second polarization-separation layer.

13. The optical element according to claim 1, wherein said second surface of said light guide body is inclined with respect to said first surface.

14. A light source device comprising:
   the optical element according to claim 1; and
   said light source that is arranged on the outer periphery of said light guide body.

15. A light source device according to claim 14, wherein said light source is a solid-state light source.

16. A projection-type display device comprising:
   the light source device according to claim 14;
   a display element that imparts image information to emitted light of said light source device; and
   projection optics that project a projected image by means of emitted light of said display element.

* * * * *

UNITED STATES PATENT AND TRADEMARK OFFICE
CERTIFICATE OF CORRECTION

PATENT NO. : 8,894,210 B2
APPLICATION NO. : 13/500249
DATED : November 25, 2014
INVENTOR(S) : Shin Tominaga Page 1 of 1

It is certified that error appears in the above-identified patent and that said Letters Patent is hereby corrected as shown below:

In the Specification

Column 2, Line 63: Before "is" insert -- It --.

Column 6, Line 66: Delete "runned" and insert -- formed --.

Column 7, Line 63: Delete "0.015 degrees." and insert -- ±0.015 degrees. --.

Column 12, Line 13: Delete "$\theta$" and insert -- $\Phi 1$ --.

Signed and Sealed this
Twenty-eighth Day of July, 2015

Michelle K. Lee
*Director of the United States Patent and Trademark Office*